Figure 3:
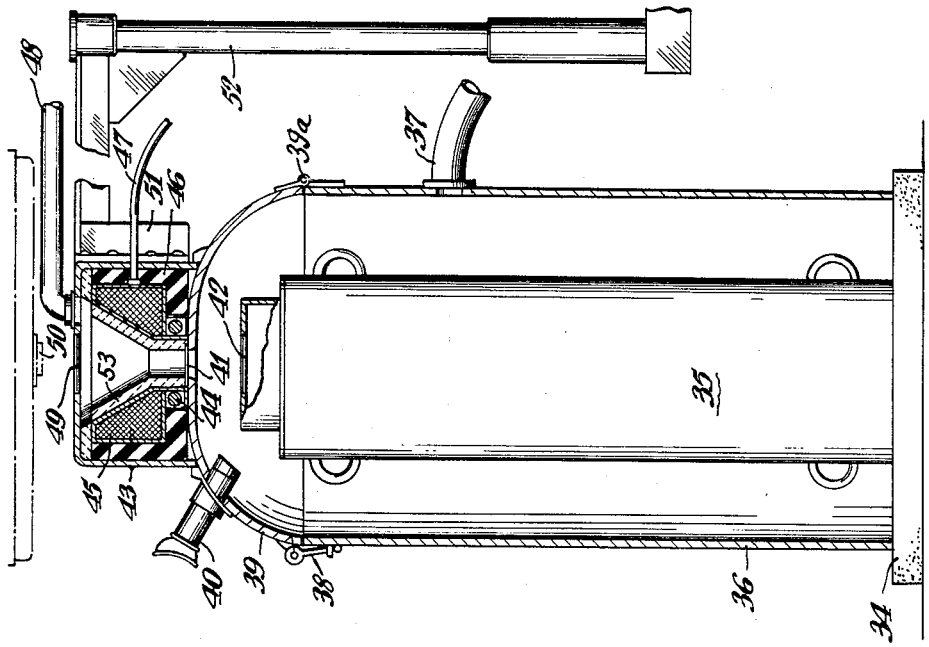

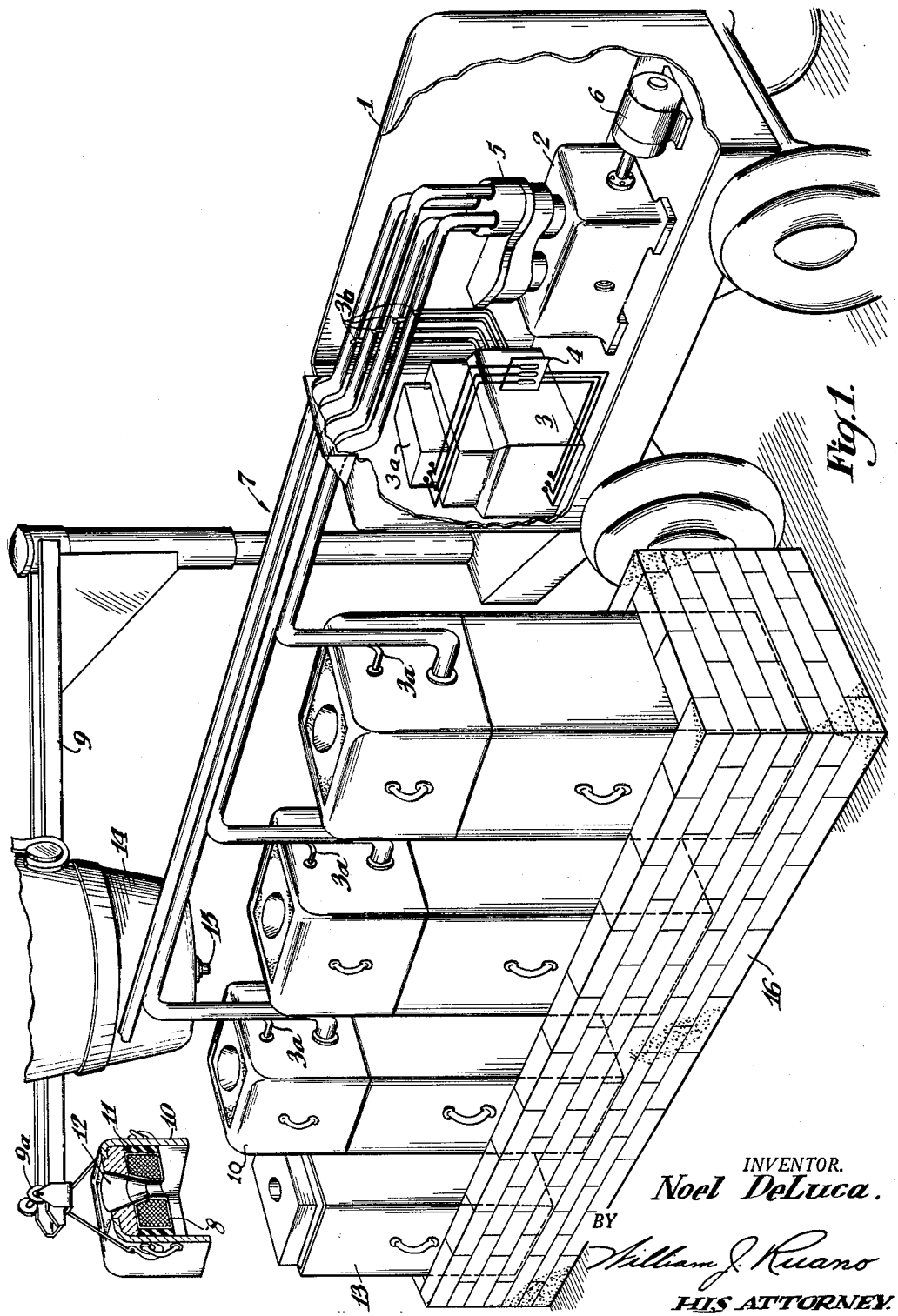

Dec. 29, 1964 N. DE LUCA 3,162,908
APPARATUS FOR APPLYING VACUUM AND SUPER-SONIC
VIBRATIONS IN CASTING STEELS
Filed Aug. 2, 1956 2 Sheets-Sheet 2

INVENTOR.
Noel DeLuca
BY
William J. Ruano
HIS ATTORNEY.

United States Patent Office
3,162,908
Patented Dec. 29, 1964

3,162,908
APPARATUS FOR APPLYING VACUUM AND SUPER-SONIC VIBRATIONS IN CASTING STEELS
Noel De Luca, Pittsburgh, Pa. (P.O. Drawer 1400, Hollywood, Fla.), assignor of thirty percent to William J. Ruano, Pittsburgh, Pa.
Filed Aug. 2, 1956, Ser. No. 601,822
8 Claims. (Cl. 22—73)

This invention relates to a method for improving the quality and performance of alloy steels. Broadly stated, it relates to the application of ultra-sonic sound energy to molten steel, either as the steel is being poured into a mold or after it has been poured therein. The present invention is a continuation-in-part of my earlier filed application Ser. No. 490,270 filed Feb. 24, 1955, now abandoned.

Probably the most serious problems confronting the steel industry for a very long period of time, which still remain unsolved, are the formation of piping, porosity and inclusions, in the formation of ingots which cause poor performance. I have made the discovery, after considerable experimentation, that most of these problems have their beginning when the steel is first poured into molds for later processing. Piping, that is the formation of pipes or funnel shaped top portions on steel ingots, as a consequence of improper solidification, necessitates removal of such pipes before further processing, which pipes constitute large portions of steel ingots and result in a tremendous waste of metal in the manufacture of finished steel products. Porosity and inclusions, such as non-metallic inclusions, including hydrogen and oxygen, as well as inclusions of a metallic nature, such as iron oxide and unstable hydrides and carbides of various metals, constitute impurities in the molten steel and result in the reduction in quality and performance of the finished steel.

In the past, numerous and varying attempts have been made to solve these problems, however such attempts have not been successful. In an endeavor to effect a high degree of purity of steel, vacuum melting processes have been introduced which comprise enclosing numerous units of the steel melting and processing equipment in a very large evacuated room or chamber in order to exclude atmospheric impurities and prevent exposure of molten steel to such impurities. Such vacuum enclosures are tremendous in size and involve considerable expense for the construction of the initial installation, as well as for maintenance thereof. This has necessitated a tremendous increase in cost for vacuum melted steel products, which has very severely limited the use of such products and confined them only to applications where cost is not a main factor, such as for constructing atomic reactors, jet engines, and the like. But even with the use of vacuum melting processes, and their attendant considerable increase in the cost of steel, the problems have not been truly solved. For instance, many impurities which occur in alloy and scrap additions become entrapped in the molten steel during the melting down process. Therefore, subsequent surrounding of the molten steel by an evacuated chamber fails to dislodge or remove such entrapped impurities, since they adhere to the iron molecules, or matrix.

An object of the present invention is to provide a novel method for highly purifying steel and greatly improving its qualities and performance, which method is devoid of the above mentioned disadvantages of presently used methods.

A more specific object of my invention is to provide a novel apparatus and method for eliminating piping, porosity and inclusions, in the making of steel ingots, so as to effect a tremendous savings in the manufacture of steel, as well as to cause an amazing and almost incredible improvement in the quality and performance of the finished steel.

A more specific object of my invention is to provide a novel method involving the application of ultra-sonic sound energy to molten steel, either while it is being poured from a ladle, or after it has been poured into an ingot mold and while it is still in molten condition and simultaneously evacuating gases which are liberated, so as to practically eliminate porosity, inclusions, as well as piping, from steel manufacture.

A more specific object of my invention is to provide a novel method for effecting a very high quality and performance of steel at a price tremendously lower than heretofore possible, thereby permitting a considerably wider use of high purity and high performance steel products, and for making steel suitable for applications having high requirements, such as atomic reactors, jet engines, guided missles, and the like.

Other objects and advantages of my invention will become more apparent from a study of the following description taken with the accompanying drawings wherein:

FIGURE 1 is a perspective view showing a plurality of ingot molds having removable covers and wherein the ultrasonic transducer is enclosed in the cover for applying supersonic sound energy to molten steel as it is being poured from the ladle through a funnel-like portion in the cover of the mold.

Figure 2:
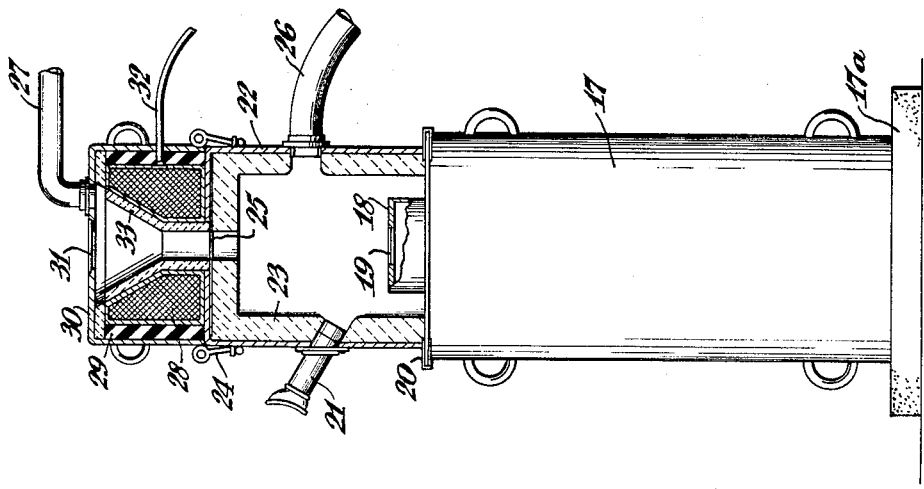

FIGURE 2 shows a modification which is particularly suitable for the manufacture of intermediate alloy steels, that is, stainless and cutlery steels for autos, valves, and the like, and which embodies the use of a removable cover for forming an evacuating chamber with the mold, which cover is provided with a detachable funnel and transducer unit, and FIGURE 3 shows a further modification of the invention which is particularly suitable for heavily alloyed steels, such as high temperature alloy steels for aircraft, rockets and supersonic devices etc. and showing the mold completely surrounded by a vacuum chamber.

Referring more particularly to FIGURE 1 of the drawing, numeral 1 denotes an equipment carrier or vehicle having mounted thereon a vacuum pump 2, preferably of high capacity, and an ultra-sonic generator 3, of any well known type, which, through wires 3b, energizes a transducer 8 of any well known type, such as a ceramic barium titanate transducer which converts the radio frequency power into high frequency ultra-sonic mechanical vibrations. Also mounted on carrier 1 is a pulse and timing regulator of any well known type (not shown) for proper timing of pulse injections of ultra-sonic energy to compensate for varying ingot sizes and for varying grades of alloy steels. A relay stand or panel 4 is provided and on which an oscilloscope (not shown) may be mounted for scoping inside the ingot mass while it is becoming solid to impart information, to the observer, concerning the process of settling, uniformity and freeze of the molten ally steel. A vacuum tank 5 is provided as an auxiliary unit for providing a vacuum. An electric driving motor 6 is provided for operating the vacuum pump. Trunk lines 7 are shielded in flexible hoses, preferably of stainless steel, which lines contain the ultra-sonic electrical supply lines and the vacuum lines that lead to the ingot chambers for applying electric energy to the transducer 8 as well as for evacuating the ingot chambers of gases.

On the carrier 1 is also mounted a boom 9 which, by means of a pulley 9a, supports an ingot mold cover 10 so as to enable lifting and lowering of the cover on the ingot mold 13. Four molds 13 have been shown for purposes of illustration and are supported in a pit such as formed by a brick wall 16. Enclosed in the ingot cover 10 is an insulating ring 11 which surrounds the transducer 8. Also enclosed in the cover 10 is a funnel 12 of refractory material through which molten steel may be poured from tap 15 of the ladle 14.

In operation, equipment carrier 1 will be driven into the position shown and the boom 9 and pulleys 9a will move the cover 10 until it is directly over ingot mold 13 and then lower it on the mold so that the bottom edge will seat on the top ledge of mold 13, partially covered with a ceramic hard top with a hole therein, and thereby form a substantially air-tight enclosure for the ingot mold. The opening at the top of funnel 12 may be sealed closed by means of an aluminum plate (not shown) and thereafter the air space in the ingot mold may be evacuated by pump 2 so as to withdraw all gaseous impurities from the interior of mold 13. Then ladle 14 is moved over the opening of the funnel 12 and tap 15 is opened to allow molten metal to pour onto funnel 12, thereby immediately melting the aluminum sealing plate hereinbefore described.

As molten metal pours through funnel 12, the transducer will generate ultra-sonic sound waves which will travel through the stream of molten metal, as well as to the molten metal which has been poured into ingot 13. Whirling magnets may be provided (not shown) immediately below and coaxial with transducer 8, which magnets comprise arcuate sections of a ring coaxial with the funnel for imparting a rotating magnetic field in the molten metal during and after pouring to effect swirling thereof so as to cause thorough agitation and homogeneity of the metal that may still be in a magnetic state.

The generator 3 supplies high frequency, electrical energy to the transducer 8 which converts it into high frequency, mechanical ultra-sonic vibrations. The vibrating transducer causes pressure waves in the molten alloy steel, which produce sub-microscopic bubbles that form and collapse many thousands of times each second. This effect, called cavitation, results in thorough and spectacular agitation initiated by the ultra-sonic vibrations.

I have found, after considerable experimentation, and contrary to prevailing opinion, that the only frequencies that will effect purification of the molten metal are ultrasonic frequencies well above 15,000 cycles per second. In fact, for optimum operation or results, the lowest frequency should be in the neighborhood of 25,000 cycles per second and the frequency range may extend up to a maximum value of about 1,250,000 per second. Frequencies above 1,250,000 per second are objectionable solely because they may effect shattering or destruction of the parts of the transducer, such as the refractory funnel etc.

Different frequencies are more suitable for different types of alloy. For example, for making mild alloy steels, such as SAE 3165 and 4130, frequencies in the range of about 50,000 to 75,000 cycles per second are best. For intermediate alloy steels, frequencies in the range of 75,000 to about 125,000 cycles per second are most suitable. And for heavy alloy steels, such as SAE 18–8; 16–8; 18–41–1; S–816 etc., frequencies in the range of 125,000 to 1,250,000 cycles per second are most desirable.

Ultra-sonic vibrations above about 25,000 cycles per second cause impurities which tend to cling to the matrix or molecules of the iron, to become dislodged or pulled apart therefrom. There is a tremendous binding energy tending to keep impurities as an integral part of the iron molecules or atoms.

I have found after unsuccessful results with lower frequencies that ultra-sonic vibrations above 15,000 cycles per second, particularly those above 25,000 cycles per second, are the only effective means for applying sufficient force to separate solid and gaseous impurities from the iron matrix. The ultra-sonic sound vibrations will cause non metallic inclusions, such as hydrogen and oxygen, to be broken up and separated from the matrix, also inclusions of a metallic nature, such as iron oxide and the unstable hydrides and carbides of various metals. The ultra-sonic vibrations effect a shattering of these small particles, into lighter particles of solid or gaseous form, and the floating of such lighter particles or movement to the outer surfaces of the molten metal, such as the side surfaces of the ingot mold, as well as to the top surface thereof from which they are easily and effectively removed almost entirely by the evacuating process after liberation from the molten mass.

The ultra-sonic energy may be continuously applied while the gas is being evacuated from the ingot mold 13 so that liberated gases will be continuously withdrawn from the mold enclosure.

As stated previously, frequencies of less than about 25,000 cycles per second have very little effect on dissolved gases and impurities since they will not cause shattering and floating of the impurities as caused by applying ultra-sonic frequencies in excess of about 25,000 cycles per second.

By enclosing the ingot chamber by cover 10, and evacuating it initially, atmospheric gases are prevented from contaminating the ingot. And by continually evacuating the gases during pouring or teeming of the molten metal, the gaseous impurities liberated by the ultra-sonic frequencies will be brought either to the surface of the molten metal and drawn out by the vacuum, or floated to the top and side surfaces of the mold and thereafter easily removed. A constant freezing or solidification point is provided, as well as uniform distribution of temperature, and piping is eliminated and its attendant waste. Stringers and splash patterns in the resulting steel are eliminated. A very homogeneous and uniform molten metal body results having very high degree of purity and spectacularly improved characteristics.

If desired, cover 10 may be closed on the top and placed on mold 13 only after molten metal has been poured therein, after which ultra-sonic frequencies may be applied, that is, during the solidification process.

FIGURE 2 shows a modified form of the invention which is particularly suitable for the manufacture of intermediate alloy steels, such as stainless and cutlery steels and those for auto valves.

An ingot mold 17 rests on a sand bed 17a. Supported on the top ledge of ingot mold 17 is a square box shaped, ceramic hot top 18, having on top thereof a hole which is sealed closed by an aluminum disc 19. Also supported on top of the mold 17 is a sheet metal, hat shaped cover 22, preferably of stainless steel, simulating a stove pipe hat, which has a top hole which is sealed by an aluminum disc 25. Cover 22 is preferably lined by a refractory liner 33. A cement layer is provided at 20 for effecting a substantially gas tight seal. A viewing tube 21 is inserted through the cover 22 to allow observation of the level of the molten metal in ingot 17. A vacuum line 26 will permit evacuation of the interior space enclosed by mold 17 and cover 22.

By means of detachable clamps 24, a top or cap 30 of sheet metal is detachably fastened to cover 22. On top of cap 30 there is a hole covered by an aluminum seal 31, seated in a shoulder portion of cap 30 surrounding the hole.

A transducer 28, surrounded by insulating ring 29, is energized by lead-in wires 32 connected to the ultra-sonic generator 3, which transducer produces ultra-sonic waves which travel through the stream of molten metal flowing through the funnel 33 made of refractory material. Immediately before, during and after the flow of molten metal through the funnel, the surrounding gas is evacuated by means of vacuum lines 27 and 26 connected to the vacuum pump 2.

As molten metal is initially poured into the ingot assembly, it will immediately melt aluminum plates 31, 25, and 19 to form a passageway to the ingot. During the flow of molten metal the ultra-sonic vibrations will influence magnetic particles in the molten stream as well as those in the ingot mold 17. After ingot mold 17 has been almost filled, as will be noted by observing through the tube 21, a new aluminum plate 31 is sealed in position to prevent entry of atmospheric air. Thus, during solidification of the molten metal in the mold 17 the surrounding air will be kept free of impurities and will be maintained in that condition by continued operation of the vacuum pump through vacuum lines 26 and 27.

After the molten metal has completely solidified, the cap assembly is unclamped by means of clamps 24 and may be placed on another cover 22 on another mold by operation of the boom connected to the vehicle carrier 1. A perfect air tight seal is actually not required for aluminum plates 31, 25 and 19.

A still further modification is shown in FIG. 3 which is particularly suitable for making very heavily alloyed steels, such as required in atomic reactors, jet engines and the like. In this modification, the ingot mold 35 is completely enclosed in a vacuum chamber or tank 36 which rests upon a sand bed 34. The interior of tank 36 is maintained in evacuated condition by the vacuum line 37 which is connected to the vacuum pump 2. A dished lid or cover 39 is detachably mounted on the chamber 36 by means of a clamp 38 and is pivotable about a hinge 39a. Mounted on and projecting through cover 39 is an observation tube or window 40 for permitting observation of the level of the molten metal in ingot mold 35.

Mounted on cover 39, in either a detachable manner as shown in FIG. 2, or in a rigid manner, is a sheet metal cap 43 of the shape of a hollow cylinder having an insulating ring 46 therein which encircles a transducer 45 energized through lead-in 47. Immediately below transducer 45 and concentric therewith are a series of arcuate segments 44 or a pair of substantially semicircular segments, which segments 44 constitute whirling magnets for effecting rotation of whatever magnetic particles appear in the molten stream or in the molten body of metal ingot 35 to effect agitation thereof and uniformity of the molten metal. The funnel 53 is of heat resistant ceramic and the space within the funnel is evacuated through a vacuum line or pipe 48 connected to the vacuum pump. Mounted in a shouldered seat surrounding a hole on top of the metal cap 43 is an aluminum disc 49 which will immediately melt when molten metal from the tap 50 of the ladle pours thereon so as to open a passageway into the funnel. Molten metal will also immediately melt aluminum seal 41 located so as to cover a hole on the top cover 39, as well as aluminum disc 42 on the ceramic hard top.

The entire transducer and funnel assembly which is mounted on top of cap 39 is detachably secured thereon and movable with respect to mold 35 by means of a supporting bracket 51 connected to boom 52.

In operation, the space which completely surrounds ingot 35 is thoroughly evacuated by means of the vacuum pump operating through vacuum line 37. In this space may also be included desiccants. Then molten metal will flow from the ladle through the funnel, melting the various aluminum discs in its path and into the ingot mold 35. The space in the funnel 53 is continually evacuated through vacuum line 48 connected to vacuum pump 2. The transducer 45 will send ultra-sonic waves through the molten stream as it passes through the funnel, as well as into the body of molten metal in ingot 35, so as to disintegrate and liberate solid and gaseous impurities and effect agitation and uniform distribution of the molten particles, particularly under the influence of whirling magnet 44. This will also effect dislodgement of the particles from the nuclei of the molten metal and breaking up of the particles into very small, floatable particles, which will migrate to the surfaces of the molten ingot body and thus become easily removable either in the solid or gaseous form, the latter being removable by vacuum pump 3. Minute additions into mold 35 before pouring, or to the molten metal, of anhydrous sodium borate will increase the stress-rupture strength.

If desired, the molten metal instead of being poured directly from a ladle into the ingot mold may be poured into a ceramic lined bucket having a spigot at one side of the bottom thereof, in which instance the transducer assembly, such as shown at the top of FIG. 3, and included in cap 43 may be placed immediately under the bottom of such bucket so as to influence the molten metal in the bucket by ultra-sonic energy before the molten metal is poured from the bucket into an ingot mold. This placement of the ultra-sonic energy unit immediately adjacent a molten body, before pouring into the ingot mold, permits a more thorough application of ultra-sonic energy to the molten metal. Or the bucket may have a bottom opening similar to tap 50, concentric with the funnel and transducer assembly, which may be connected, in a detachable manner, to the bottom of the bucket, if desired.

Likewise other means may be devised for more effectively applying the ultra-sonic energy to the molten metal at any time before or during the solidification process so as to insure purification and uniform dispersion of the molten metal particles. Also other metals than steel may be purified.

Thus it will be seen that I have provided a highly efficient and relatively inexpensive method for effecting an amazingly high degree of purity in molten steel alloys during or after the teeming process, and which easily and quickly rids the metal of impurities of various kinds, including both solid and gaseous impurities, so as to substantially completely eliminate piping, porosity and inclusions, and therefore effect a tremendously great savings in material; furthermore I have provided a novel method including the application of ultra-sonic frequencies in the range of about 25,000 to 1,250,000 cycles per second to accomplish the above stated purposes of the present invention.

While I have illustrated and described several specific embodiments of my invention, it will be understood that these are by way of illustration only, and that various changes and modifications may be made within the contemplation of my invention and within the scope of the following claims.

I claim:

1. Apparatus for processing steel while in molten condition in an ingot mold, comprising a cover for placement on said ingot mold, said cover including a transducer enclosed in said cover and energized by a radio frequency generator for producing ultra-sonic sound vibrations above 15,000 cycles per second, and an opening in said transducer through which molten steel may be poured while its stream is being subjected to said vibrations.

2. Apparatus as recited in claim 1, together with means including a vacuum pump for evacuating, through said cover, the space contained within the cover and mold so as to withdraw gaseous impurities released as the result of disintegration and liberation by said ultra-sonic vibrations.

3. In combination with an ingot mold, a cover including a transducer having a central opening extending vertically therethrough, a funnel included in said opening, a hole in said cover in registry with said funnel and through which molten metal may be poured into the ingot mold, means for energizing said transducer so as to generate ultra-sonic vibrations in the stream of molten metal as it flows through said funnel and while in said mold.

4. Apparatus as recited in claim 3, together with a magnet coaxial with said funnel for providing a rotating magnetic field to agitate the magnetic particles of said molten metal stream.

5. In combination with an ingot mold, a cover supported on said mold forming an enclosure, a transducer detachably mounted on said cover and including a funnel of refractory material therein, means for applying radio frequency current to said transducer so as to generate ultra-sonic vibrations in excess of about 25,000 cycles per second so as to subject the molten stream of metal, going through the funnel and into the mold, with said vibrations to disintegrate particles and liberate them in gaseous form, and means for simultaneously evacuating the space enclosed within said cover and mold.

6. Apparatus as recited in claim 5 together with an aluminum sheet covering a hole in said cover above and in registry with said funnel, which sheet normally seals said funnel from infiltration of outside air but which becomes melted upon pouring molten metal thereon.

7. In combination with an ingot mold, an enclosure totally surrounding said mold, vacuum line means connected to said enclosure, a vacuum pump for evacuating said enclosure through said line, means for generating ultra-sonic sound vibrations in excess of 15,000 cycles per second and including a transducer mounted on top of said enclosure and being in communication with said enclosure and including a funnel of refractory material through which molten metal may be poured into said ingot mold, whereby said stream of molten metal, as it passes through the funnel, will be subjected to said ultra-sonic sound vibrations.

8. In combination with an ingot mold, a hollow cylindrical enclosure including a detachable cover having an opening centrally thereof, a cap supported on said cover, a transducer enclosed in said cap, a ceramic funnel enclosed within said transducer coaxially therewith, a source of radio frequency waves for energizing said transducer so that the latter will generate ultra-sonic frequency currents in the range of about 25,000 to 1,250,000 cycles per second, vacuum lines connected to said cover and to said cap so as to continuously evacuate the space within the funnel and within said enclosure while metal is being poured through said funnel and is being subjected to said ultra-sonic frequency currents.

References Cited by the Examiner
UNITED STATES PATENTS

| | | | |
|---|---|---|---|
| 1,319,500 | 10/19 | Whalen | 22—73 XR |
| 1,939,712 | 12/33 | Mahoux. | |
| 2,117,114 | 5/38 | Hazey | 22—73 |
| 2,163,649 | 6/39 | Weaver. | |
| 2,190,209 | 2/40 | Hazey | 22—73 |
| 2,419,373 | 4/47 | Schrumm | 22—57 |
| 2,567,525 | 9/51 | Morris | 22—74 |
| 2,713,183 | 7/55 | Winkler | 22—73 |
| 2,725,219 | 11/55 | Firth | 310—26 XR |
| 2,734,241 | 2/56 | Southern et al. | 22—73 |
| 2,763,040 | 9/56 | Korb | 22—57.2 |
| 2,811,437 | 10/57 | Fessler | 75—49 |
| 2,920,362 | 1/60 | Ludwig | 22—216 |

FOREIGN PATENTS

| | | |
|---|---|---|
| 683,996 | 3/30 | France. |
| 22,594 | 8/03 | Great Britain. |
| 456,657 | 11/36 | Great Britain. |
| 699,156 | 10/53 | Great Britain. |

OTHER REFERENCES

Metall (German Journal): Article by Dr. E. Schrip, Giessero Unter Extremen Bedingungen, December 1952, pages 734–744.

Metallurgia: "Some Metallurgical Applications of Ultrasonics," Crawford, published March 1953, vol. 47, No. 281, pages 109–113.

Hiedmann: Metallurgical Effects of Ultrasonic Waves, The Journal of the Acoustical Society of America, vol. 26, No. 5, September 1954, pages 831–842.

MICHAEL V. BRINDISI, *Primary Examiner.*

CLAUDE A. LeROY, RAY K. WINDHAM,
*Examiners.*